United States Patent [19]

Strothmann

[11] Patent Number: 4,603,484

[45] Date of Patent: Aug. 5, 1986

[54] LEVEL SENSING APPARATUS PROVIDING OUTPUT SIGNALS COMPATIBLE WITH DIGITAL APPARATUS

[76] Inventor: Thomas Strothmann, 5405 S. Camino de la Tierra, Tucson, Ariz. 85746

[21] Appl. No.: 707,747

[22] Filed: Mar. 4, 1985

[51] Int. Cl.[4] .................................................. G01C 9/06
[52] U.S. Cl. ...................................................... 33/366
[58] Field of Search .................... 33/366; 200/182, 220

[56] References Cited

U.S. PATENT DOCUMENTS

| | | | |
|---|---|---|---|
| 2,338,811 | 1/1944 | Hasbrock | 33/366 |
| 2,611,188 | 9/1952 | Bell | 33/366 |
| 3,225,450 | 12/1965 | Stanley | 33/366 |

FOREIGN PATENT DOCUMENTS 7906561  8/1979  Netherlands ........................ 33/366

Primary Examiner—Willis Little
Attorney, Agent, or Firm—Harry M. Weiss

[57] ABSTRACT

Apparatus and method for determining a deviation of a body from a horizontal plane is disclosed. Attached to the body is a curved surface with a liquid conducting material moving freely thereon. Associated with the surface are electrodes at preselected positions and a surface at ground potential. As the liquid conducting material moves on the inner portion of the curved surface, the liquid conducting material provides a conducting path between the electrodes providing a resulting electrical activity such as a current flow. The electrical coupling of the electrodes is identified and the electrode(s) so activated identify a position on the curved surface and consequently when the curvature of the surface is known, a deviation from the horizontal plane can be determined. The position of the electrodes and the electrical structure thereof provide suitable signals for use by digital signal apparatus.

16 Claims, 6 Drawing Figures

LEVEL SENSING APPARATUS PROVIDING OUTPUT SIGNALS COMPATIBLE WITH DIGITAL APPARATUS

BACKGROUND OF THE INVENTION

1. Field of the Invention

This invention relates generally to the determination of the deviation of a body position from a horizontal plane and, more particularly, to apparatus for measuring the angle of deviation from a horizontal plane as defined by the gravitation field, the apparatus having an output signal suitable for input to electronic devices.

2. Discussion of the Related Art

One method for determining the deviation of a body position from a horizontal position is to provide a suspended apparatus, such as a pendulum, coupled to the body for which deviation from a reference direction is desired. When the body position is at an angle relative to the reference plane, then the pendulum is positioned at an angle to the member. The deviation of the perpendicular for the equilibirum position can be measured by several techniques, such as detection of the interruption of a beam of radiation or by other position sensing apparatus. In general however, such apparatus is not suitable for directly providing signals for an electronic data processing system.

Similarly, it is known in the related art to use at least one gyroscopic device to determine a reference plane and to rely on the conservation of angular momentum and a minimization of friction to detect the deviation from the reference plane. Similarly, gyroscopic devices have been designed using a laser apparatus in which the changes in the standing wave produced by the laser can be analyzed and a rotation in space can be determined. In both the mechanical and the laser gyroscopic devices, the apparatus is expensive, extremely sensitive and requires a skilled adjustment. In addition, the sensing of the deviation from the original position requires a sophisticated detection apparatus.

A need was therefore felt for a device that could be manufactured inexpensively, would provide a measure of the deviation of a body from a (horizontal) reference plane and; in addition, would provide an output signals capable of direct application to a data processing system.

SUMMARY OF THE INVENTION

It is therefore an object of the present invention to provide apparatus for determining the deviation of a body from a horizontal plane.

It is another object of the present invention to provide apparatus for measuring the deviation from a horizontal plane with output signals that are suitable for use by data processing system.

It is a more particular object of the present invention to provide a curved surface in which a quantity of conducting liquid can move freely about, and in which the conducting liquid can make an electrical connection between an electrode with a potential voltage applied thereto and the ground potential or between two electrodes.

The aforementioned and other objects are accomplished, according the the present invention, by placing a series of electrodes in a pre-established position with respect to a conducting surface. A quantity of liquid conducting material is placed on the curved surface and the curved surface is coupled to the body for which the deviation from the horizontal position is to be determined. The liquid conducting material will seek the lowest point of the curved surface and at that point will provide a conducting path between the ground potential and at least one of the electrodes. The change in resistance between the ground potential and the series of electrodes can be implemented to be equivalent to a logic signal. The logic signal can determine the lowest point of the curved surface at a given time and consequently can determine the deviation of the sensor from a predetermined direction.

These and other features of the present invention will be understood upon reading of the following description along with the drawings.

DESCRIPTION OF THE PREFERRED EMBODIMENT

Detailed Description of the Figures

Figure 1:
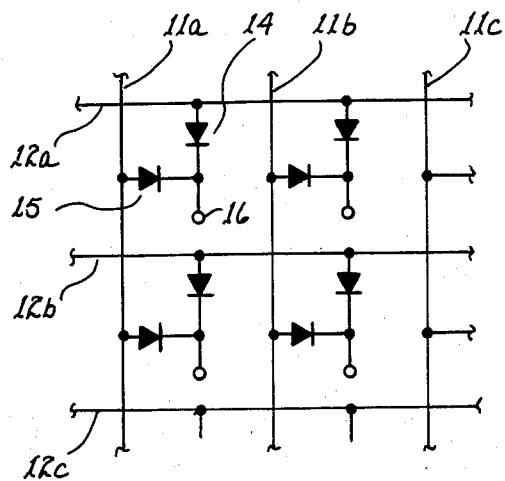
FIG. 1 illustrates a matrix of electrodes that can be used in connection with the level sensing apparatus of the present apparatus.

Referring to FIG. 1, a grid of electrodes 16 is shown. The electrodes are coupled to a multiplicity of horizontal conducting members, shown as 12a through 12c, and to a multiplicity of vertical conducting members, designated 11a through 11c, in the Figure. Each electrode 16 is coupled to the vertical conductor by a diode 15 and coupled to a predetermined one of the horizontal conductors by diode 14. In the FIG. 1, the electrodes 16 are typically grounded during the operation of the apparatus and therefore the cathode of the diode are coupled to that electrode.

Figure 2:
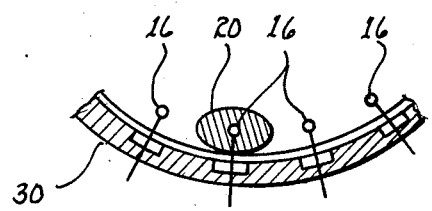
FIG. 2 shows an implementation of the grid of electrodes of FIG. 1 with curved surface.

Referring next to FIG. 2, the use of electrodes of FIG. 1 with a curved surface 30 is shown. The electrodes 16 project through the wall of the curved material 30 and have insulating region around the conducting elements. Coated on the wall of the curved surface 30 is a conducting coating 31 and this conducting surface is coupled to the ground potential. Depending upon the orientation of the curved surface 30, the conducting liquid 20 can move along the surface until it reaches the lowest point under the influence of gravity. At the lowest point, at least one electrode 16 will be in contact with the conducting liquid. The conducting liquid will cause a short circuit between the grounded conducting wall of the surface 30 and the electrodes 16 causing a current to flow through the two diodes. Sensing elements associated with the horizontal and vertical conducting members of FIG. 1, sense the flow the current and because the identification of the particular vertical conducting line and the particular horizontal conducting line defines an associated electrode, the low point of the curved surface is therefore determined.

Figure 3:
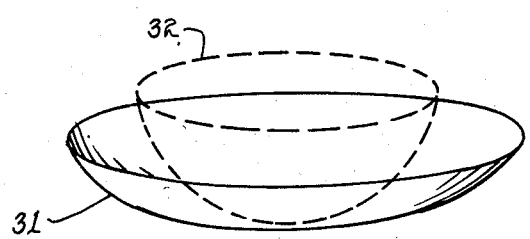
FIG. 3 shows that the variation in curvature of the surface can used to vary the sensitivity of the apparatus in establishing the deviation from a horizontal plane.

Referring next to FIG. 3, two curved surfaces 31 and 32 are shown. These two surfaces are used to illustrate the result that the surface 31 with the larger radius will be more sensitive to devivations from the vertical position than will the curved surface 32, given the same density of electrodes 16.

Figure 4:
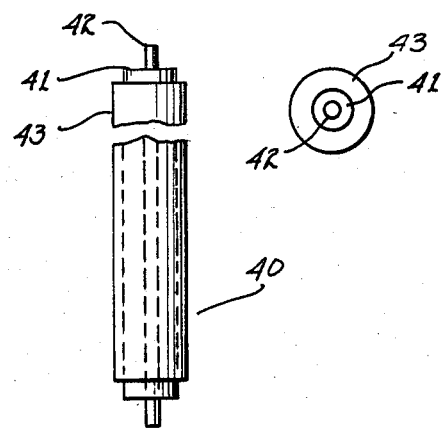
FIG. 4 is an illustration of a pair of electrodes that can be used in an appropriate arrangement of electrodes to determine the angle of deviation from a horizontal plane according to the present invention.

Referring next to FIG. 4, a different electrode structure is shown. In this electrode structure, the outer surface 43 and the intermost member 42 are comprised of conducting materials. These two conducting materials are separated from each other by an insulating region 41.

Figure 5:
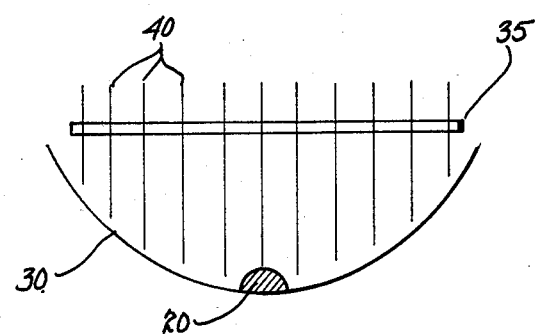
FIG. 5 shows the use of the electrodes of FIG. 4 in conjunction with the curved surface and a liquid conductor material to determine the deviation from a horizontal plane.

Referring next to FIG. 5, the use of the electrodes 40 of FIG. 4 to determine the deviation from vertical of a body is shown. The electrodes 40 have a support member 35 that has a fixed relationship with the surface upon which the liquid conductor 20 can move. As the surface 30 and consequently the support member 35 are tilted, the liquid conductor 20 will assume the lowest position and that position will be an indication of the deviation from the vertical position. The surface of curved member 30 is once again covered or coated with the conduction material and placed at a ground potential so that when the electrode 40 comes in contact with the liquid conductor, the conductor of the outer surface and the conductor of the inner core 42 will be shorted to ground. In the preferred embodiment, the interior conductor is coupled to one set of conducting leads (e.g., the horizontal set of leads), while the external conductor 43 is coupled to a second set of conduction leads (e.g., the vertical set of leads) with the result that current sensing elements in the conducting leads will register the flow of the current and can activate appropriate apparatus.

Figure 6:
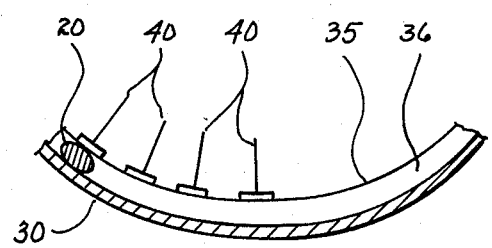
FIG. 6 shows yet another configuration for placing the electrodes, the conducting liquid, and the curved surface for determining the deviation from a horizontal plane.

Referring to FIG. 6, a different configuration is shown. The curved support member 30, in this case has a second curved surface 35 placed in a predetermined relationship with respect to the surface. The surface 30 has a conducting coating applied to the interior surface thereof and a quantity of liquid conductor 20 is constrained to move in the area 36 between the surfaces of member 35 and member 30. Electrodes such as 40 can be secured by the surface 35 so that as the liquid conductor 20 moved within the reqion 36, electrodes are activated that will be determined by the low position of the curved surface 30.

Operation of the Preferred Embodiment

The invention for determining the deviation of a body from a vertical orientation depends on the force of gravity to force the liquid, in this case, a conducting liquid, to the lowest point on the surface. It will be clear that in the case of momentum components acting on the liquid conductor, that the liquid can be moved from the lowest position. However, in the preferred embodiment the liquid conductor is mercury and because of the density, requires a substantial force to move the liquid away from the reqion of lowest gravitational potential. Placed in a preselected relationship to the curved surface are the series of electrodes. The electrodes can be of the form 16 or of the form 40, but generally serve to activate at least two conducting elements simultaneously by establishing a the conducting path between the two elements. The activation of two electrodes simultaneously defines a location in the grid of electrodes. This electrical short circuit causes the current in associated conducting elements to flow and these conducting elements can pinpoint, within the granularity of the grid of electrodes, the position currently occupied by the conducting liquid and this position can be related to the lowest position of the curved member at an equilibrium position.

The use of various curvatures and, in fact, the use of a combination of curvatures can be used to adjust the sensitivity of the measurement. For example, a combination of a modest curvature at the middle of the curved member along with a more pronounced curvature towards the exterior portions of the curved surface can result in a high sensitivity close to the vertical position with the sensitivity becoming less pronounced as the deviation from the horizontal plane becomes increasingly large.

Electrode 40 has the advantage that the two conducting elements of the grid are not electrically coupled and therefore the diodes do not have to be utilized therewith to prevent leakage current when one member of the line is activated. It will be clear in both the configuration shown in FIG. 1 and in the electrode configuration of FIG. 4, that the activation of the grid lines is ideally suited to a binary input. The presence of a current can be a logic one while the absense of a current can be a logic zero and the resulting logic signals can either be placed in a register or the sensing elements can be interrogated periodically.

It will be clear that many of the conducting liquid materials are subject to the effects of water vapor and/or the oxygen molecules of the atmosphere. To minimize these effects, the container holding the level sensing apparatus can be enclosed and an inert atmosphere can be sealed in the enclosure. Similarly, a dissicant material can be next added to the enclosure to protect the liquid conductor.

The use of two electrodes at a single location can define that location in terms of a grid arrangement. It will be clear that a single electrode at each grid position can be used to define the location, the identification resulting from the association of each electrode with a grid location.

It will be clear that the invention relies on the orientation of the gravitational field. However, by appropriate calibration of the curved surface, to determine the equilibrium position, i.e. the lowest point of the gravitational well, deviation of the sensor from the other orientations can be determined.

The above description is included to illustrate the operation of the preferred embodiment and is not means to limit the scope of the invention. The scope of the invention is to be limited only by the following claims. From the above discusstion, many variations will be apparent to one skilled in the art that would yet be encompassed by the spirit and scope of the invention.

What is claimed is:

1. An electronic level sensor comprising:
    a curved surface having a varying radius of curvature;
    a conducting material free to move on said curved surface, said conducting material reaching a position on said surface determined by a deviation of said surface from a predetermined orientation;
    a plurality of first electrodes having a pre-established relationship with said curved surface, wherein said first electrodes are electrically coupled in a first array, said first electrodes also being coupled in a second array; each of said electrodes of said first array designating a first parameter with respect to said surface position, each of said electrodes of said second array designating a second parameter with respect to said surface position; and at least one second electrode, said conducting material completing a conducting path between said at least one second electrode and a one of said first electrodes, each of said conducting paths establishing a surface position.

2. The electronic level sensor of claim 1 wherein said at least one second electrode includes a second plurality of electrodes, wherein each of said plurality of first electrodes has a pre-selected second electrodes associated therewith, said first and said pre-selected electrodes forming a common electrode structure.

3. The electronic level sensor of claim 2 wherein said first array of electrodes are associated with said plurality of first electrodes and said second array electrodes are associated with said second plurality of electrodes.

4. The electronic level sensor of claim 1 wherein said curved surface has a radius of curvature dependent on a distance from an equilibrium position.

5. The electronic sensor of claim 4 wherein said conducting material is mercury, said electronic level sensor further including means to reduce chemical activity of said mercury.

6. The electronic sensor of claim 1 wherein said conducting material is constrained to move between said curved surface and a second surface while remaining in contact with each of said surfaces, wherein a one of said surfaces includes said first electrodes and a second of said surfaces include said at least one second electrode.

7. A method for determining spatial orientation relative to a pre-determined spatial orientation comprising the steps of:

associating a surface with said spatial orientation, said surface forming a potential well with respect to the force of gravity;

allowing a conducting material to move freely on said surface; and associating a plurality of electrodes with said surface wherein a first array of electrodes are electrically coupled, wherein a second plurality of groups of said electrodes are electrically coupled, wherein a conducting path formed by two of said electrodes including a one of said first array and a one of said second array and said conducting material establishes a position on said surface.

8. The method of determining a spatial orientation of claim 7 wherein further including the step of providing an electrode structure that includes two of said plurality of electrodes, said conducting path including said two electrodes of said electrode structure.

9. The method of determining a spatial orientation of claim 7 further including the step of arranging said surface to have a radius of curvature that decreases as a function of distance from an equilibrium position.

10. The method of determining a spatial direction of claim 7 wherein said associating step further includes the step of associating said first electrode array with a first parameter of said surface and associating a second electrode array with a second parameter of said surface.

11. Apparatus for determining a spatial orientation of a body comprising:

surface means having a varying radius of curvature coupled to said body;

conducting means for moving on said surface means to a position determined by a force of gravity, said conductor moving on said surface member to a position determined by said gravitational force and an orientation of said body; and electrode means having a pre-established relationship with said surface means for completing a conducting path with two of said plurality of electrodes and said conducting means, wherein said electrode means includes a multiplicity of electrodes, said electrodes being coupled in a first array, said electrode also being coupled in a plurality of second array, said first electrode array and said second electrode array being associated with first and second position parameters of said surface means.

12. The orientation determining apparatus of claim 11 wherein said conducting material is a conducting liquid.

13. The orientation determining apparatus of claim 12 wherein said surface means is arranged to have a radius of curvature that is a function of position on said surface means.

14. The orientation determining apparatus of claim 12 wherein two of said plurality of electrodes are associated with each conducting path and are implemented in a common electrode structure.

15. The orientation determining apparatus of claim 12 further including a second surface means wherein said conducting material is constrained to move between said surface means and said second surface means, while remaining in contact with said surface means and said second surface means.

16. The orientation determining apparatus of claim 12 wherein said surface means has a radius curvature determined by a distance from an equilibrium point.

* * * * *